May 9, 1933.  W. H. GREENLEAF  1,907,792
BEARING
Filed March 1, 1929

INVENTOR.
William H. Greenleaf
BY
ATTORNEYS.

Patented May 9, 1933

1,907,792

UNITED STATES PATENT OFFICE

WILLIAM H. GREENLEAF, OF CHICAGO, ILLINOIS, ASSIGNOR TO WESTERN CLOCK COMPANY, OF PERU, ILLINOIS, A CORPORATION OF ILLINOIS

BEARING

Application filed March 1, 1929. Serial No. 343,703.

My invention relates to bearings and has for its object the production of a bearing that is extremely efficient and frictionless so that it can replace the jewelled bearings commonly used in watches, clocks and delicate electrical instruments, and at the same time extremely rugged in construction so that it will stand up and not crack or break under the extreme vibration and jarring such as is incidental to the use of such devices when they are on automobiles, motor boats and aeroplanes.

A further object of my invention is the production of a bearing that retains a comparatively large quantity of the lubricating oil at the bearing surfaces of the bearing itself, as well as the bearing surfaces on the shaft or pivot used in conjunction with said bearing.

A further object of my invention is the production of such an efficient bearing which is very simple in construction, easy to assemble, very durable against wear and very inexpensive to produce.

I attain these objects by the means shown in the accompanying drawing in which.

Similar numerals represent similar parts through the several views.

Figure 1:
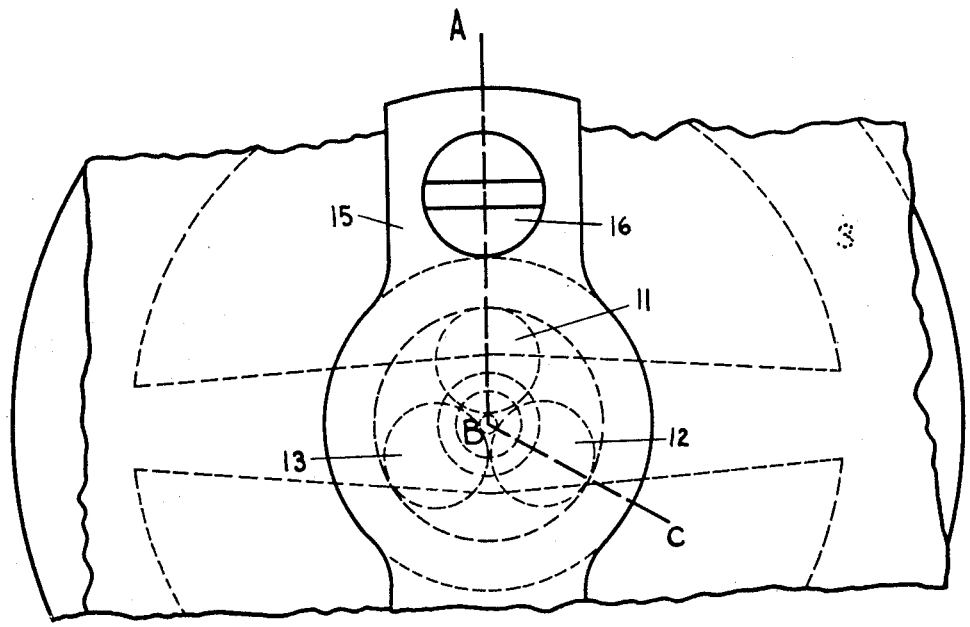
Fig. 1 is a fragmentary side view of a balance wheel device using my bearing.

In the drawing, 1 and 2 represent the front and rear plates of a clock movement having a balance wheel 3 which is mounted on a staff or shaft 4 which balance 4 is reciprocated by means of the usual hair spring 5 also attached to said shaft 4, as well as the usual impulse pin 6 and the usual guard roll 7 which are associated with usual lever actuated by the usual clock movement both of which are not shown because they are well known and old in the art. Shaft 4 has a bearing or pivot 8 on each of its ends with conical or reenforcing part 9 where said pivot is formed off of the shaft 4 and each pivot preferably has a more or less rounded end 10 all as shown in Figure 2.

Figure 2:
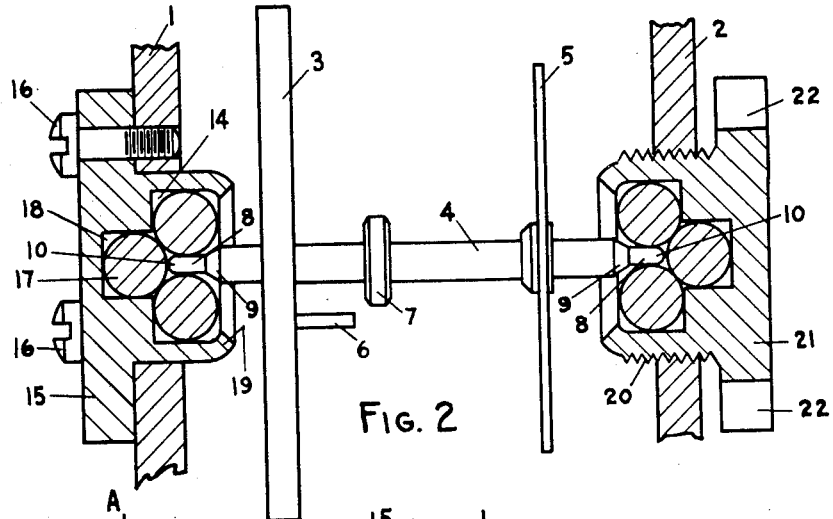
Fig. 2 is a front view of the device shown in Figure 1 showing my bearing in section along a line ABC of Figure 1.

The pivot 8 rests in the space formed intermediate the three balls 11, 12, and 13 regular high grade polished which are forced into circular aperture 14 in the receptacle 15 which is fitted in an aperture in the front plate 1 and held therein by means of the screws 16 as shown in Figure 2. The rounded end 10 of the pivot 9 is prevented from moving too much endwise by means of the ball 17 which is centrally disposed in relation to the balls 11, 12, and 13 and held in position in the aperture 18 in the receptacle 15. The balls 11, 12 and 13 may be forced into the aperture 14 and frictionally held therein or they may be placed therein and the edge of the aperture 14 turned, forced or rolled over as shown at 19 to hold said balls in proper relation to each other. While I preferably use 3 balls as shown it is evident that more than 3 balls can be used especially if it is necessary or desirable to use a larger pivot.

The similar receptacle 21 which carries the bearing for pivot 10 in plate 2 has a screw threaded part 20 which is rather tightly fitted into the threaded aperture shown in plate 2 so that the end shake allowed for the pivot 10 can be properly adjusted and said receptacle 21 has notches 22 by means of which it can be readily adjusted with a suitable wrench.

Figures 3, 4:
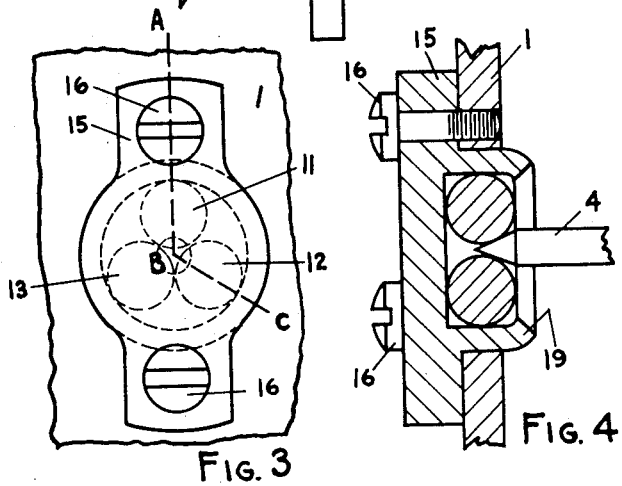
Figure 3 is a side view of a modification of my bearing showing it used with a conical bearing on the end of the shaft.
Figure 4 is a cross sectional view of my bearing shown in Figure 3 along a line ABC of said Figure 3.

In the modification shown in Figures 3 and 4 the shaft 4 instead of having a cylindrical pivot with a more or less rounded end, has a conical point and uses preferably only 3 balls as shown.

With my bearing it is evident that the balls do not rotate as is usual in ball bearings but each ball forms a bearing support point which points may or may not lie in a common plane and further the balls furnish a large expanse of closely associated surfaces so that a drop of oil put into my bearing is capillarily attracted by said surfaces and the surface of the pivoted or conical end of the shaft so that the oil will be definitely retained in the bearing where it is needed and not be permitted to run off and leave the bearing dry as is the case with the bearings used on said class of instruments previous to my invention. I further find that the pivoted ends 8 need not have more than a spring temper in hardness and therefore will not break under the extreme vibration when used in instruments on automobiles and I further find that by plating chromium on the said pivots and the associated balls that the efficiency is materially increased and that the bearing will wear practically indefinitely.

From the above description of my bearing it is evident that it is very easy to construct and assemble it, that it will retain the oil indefinitely around the pivoted end of the shaft, that it will wear indefinitely and will not crack or break even under the severest conditions of vibration, and produces an extremely efficient bearing at a very low cost.

It will be understood, of course, that while I have here shown one form of my invention, I do not wish to limit myself to the exact constructon shown but desire to have it taken in a sense illustrative of any and all the forms that come fairly within the scope of my claims.

I claim:

1. A receptacle having a bottomed aperture, a centrally disposed smaller aperture associated therewith, a ball fastened in said smaller aperture, three balls associated with said ball fastened against rotation in said larger aperture, in combination with a shaft having a part journaled in said three balls and a rounded end portion that contacts with the ball in the smaller aperture to limit the sidewise motion of said shaft.

2. A receptacle having a bottomed aperture, a centrally disposed smaller aperture associated therewith, a ball fastened in said smaller aperture, a plurality of balls associated with said ball fastened against rotation in said larger aperture, in combination with a shaft having a part journaled in said balls and a rounded end portion that contacts with the ball in the smaller aperture to limit the sidewise motion of said shaft.

WILLIAM H. GREENLEAF.